Nov. 23, 1943.  I. SPINNER ET AL  2,334,963
LAMINATING MACHINE
Filed Dec. 8, 1941    7 Sheets-Sheet 1

Fig.1

INVENTORS.
Isidore Spinner
Christian B. Nelson
and Gustave Schieman,
Parkinson + Lane Attys.

Witness:

Nov. 23, 1943.   I. SPINNER ET AL   2,334,963
LAMINATING MACHINE
Filed Dec. 8, 1941   7 Sheets-Sheet 7

INVENTORS.
Isidore Spinner
Christian B. Nelson
and Gustave Schieman
Parkinson & Lane Attys.

Patented Nov. 23, 1943

2,334,963

UNITED STATES PATENT OFFICE 2,334,963

LAMINATING MACHINE

Isidore Spinner and Christian B. Nelson, Chicago, Ill., and Gustave Schieman, New York, N. Y., assignors to International Plastic Corporation, Chicago, Ill., a corporation of Illinois Application December 8, 1941, Serial No. 422,160

5 Claims. (Cl. 154—36)

This invention relates to laminating machines and more particularly to such machines for laminating stock such as paper or cardboard and a cellulosic material such as Cellophane.

One object of the present invention is to provide a machine which will quickly, accurately and inexpensively laminate materials of the type above mentioned and which at the same time can be readily adjusted to take care of different sizes of material upon which it is desired to operate.

With the above and other objects in view the invention will now be described with reference to the accompanying drawings in which.

Referring to the drawings, the machine of the present invention is mounted on any suitable framework which may include standards, such as 2, and cross braces or beams, such as 4, to one of which latter is pivoted the foot treadle 6 with the aid of which the machine can be started or stopped. The present machine is adapted to be operated by power from an electric motor 8 suspended from the framework of the machine, the connection from the foot treadle 6 to said motor being through a linkage 10 and a clutch 12 whereby on depressing the treadle the two parts of the clutch will be caused to be engaged as usual, this in turn bringing about the rotation of a shaft 14 to which is fixed a pulley 16 around which and a second pulley 18, is passed an endless belt 20, the pulley 18 being fixed to a second shaft 22.

Figure 2:
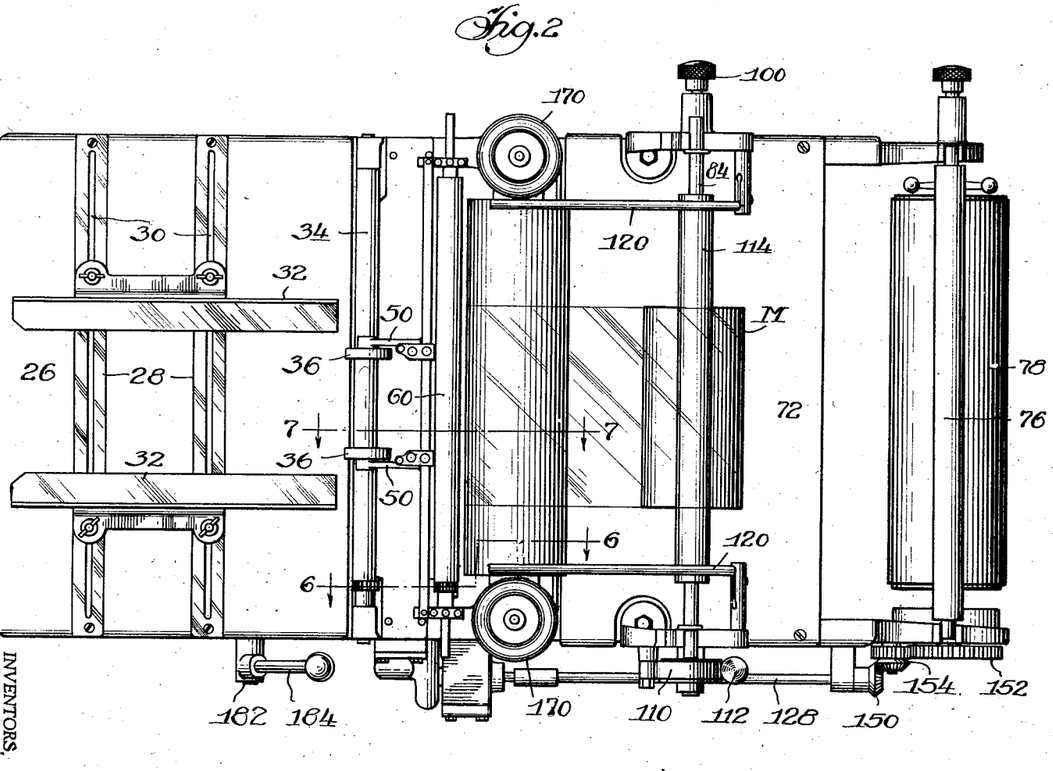
Fig. 2 is a plan view thereof.

Mounted on or integral with the framework at either side of the machine and extending longitudinally thereof is a side plate designated generally by the numeral 24 and on the top of these side plates there is mounted to extend transversely of the machine a table 26 adapted to receive the paper or other stock S to be covered with the Cellophane or other cellulosic material M. Extending across the table is a pair of arms 28 (see Fig. 2) having guide-ways 30 therein by which stock positioning means, such as the angle irons 32, can be adjusted transversely of the machine so as to accommodate different widths of stock and properly position it with relation to the other parts of the machine hereinafter to be described.

As the stock S is fed sheet by sheet from the table, it is first passed between a roller 34 and a pair of rolls 36 which can be adjusted so as to accommodate not only different thicknesses of stock but also with relation to one another transversely of the machine so as to take care of stock of varying widths. Extending upwardly from the top of the side plates 24 on each side of the machine is a bracket 38 (see Fig. 6) to the top of which is connected a forwardly extending arm 40, the arms being secured to the brackets by means of screws 42. The arms 40 carry a square bar 44 which extends across the machine and on this bar is adjustably mounted carriage-like members 46 to each of which, in turn, is pivoted, as at 48, a forwardly extending arm 50 on which the rolls 36 are pivotally mounted as at 52. By releasing a screw 54, a carriage 46 can be unlocked from the bar 44 and then, together with its associated roll, be moved to any position desired transversely of the machine. The clearance between the roller 34 and the rolls 36 is controlled by its associated screws 56 and 58; namely, if a screw 58 is released and its associated screw 56 is tightened, the latter will exert pressure upon the tip of the arm 50 to the rear of its pivot 48 and hence the clearance between the roller 34 and the roll 36 will be increased. On the other hand, if the screw 56 is loosened and the associated screw 58 tightened, the latter, as it will contact the arm 50 in front of the pivot 48, will exert pressure on the arm and hence depress the roll 36.

Figures 6, 7, 13, 14:
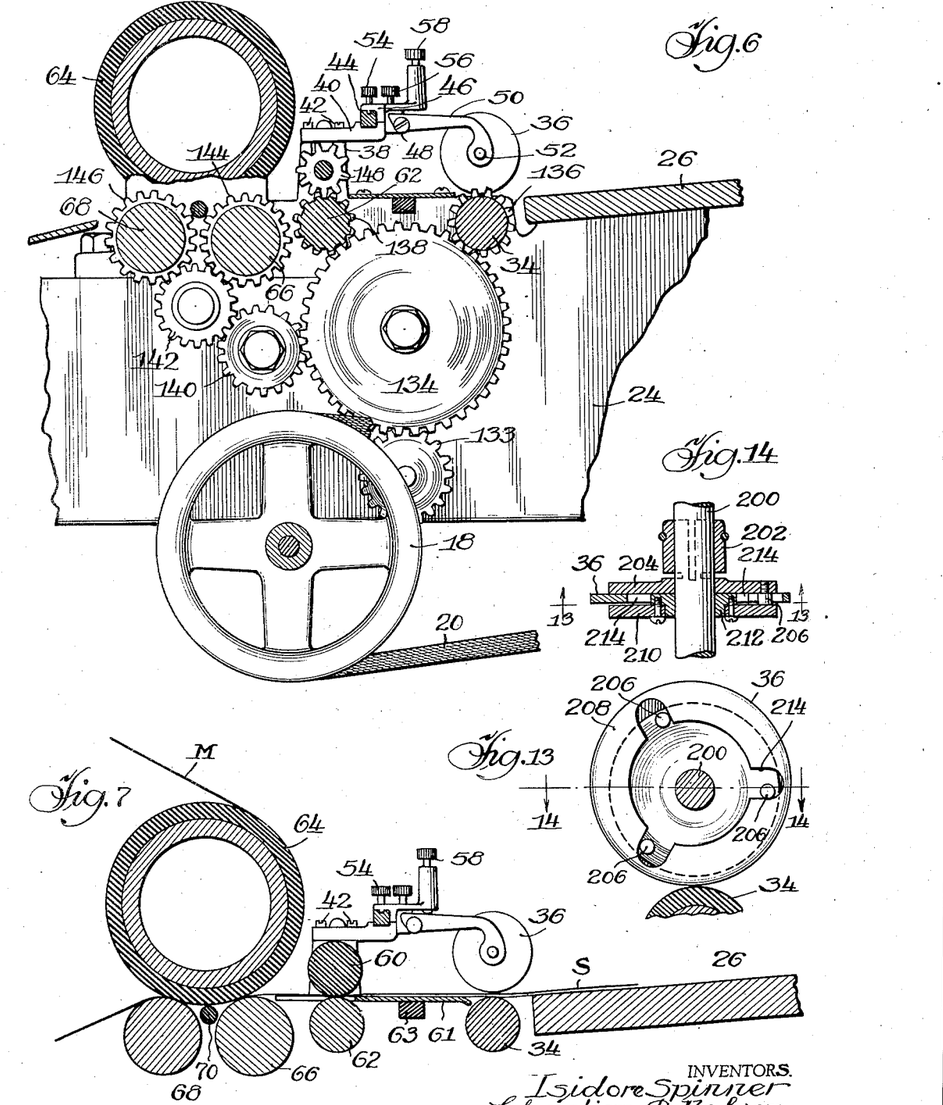
Fig. 6 is a longitudinal section on the line 6—6 of Fig. 2.
Fig. 7 is also a longitudinal section but on the line 7—7 of Fig. 2.
Fig. 13 is a modified form of one of the rollers of the machine taken on the line 13—13 of Fig. 14.
Fig. 14 is a horizontal section taken on the line 14—14 of Fig. 13.
Figures 10, 11, 12:
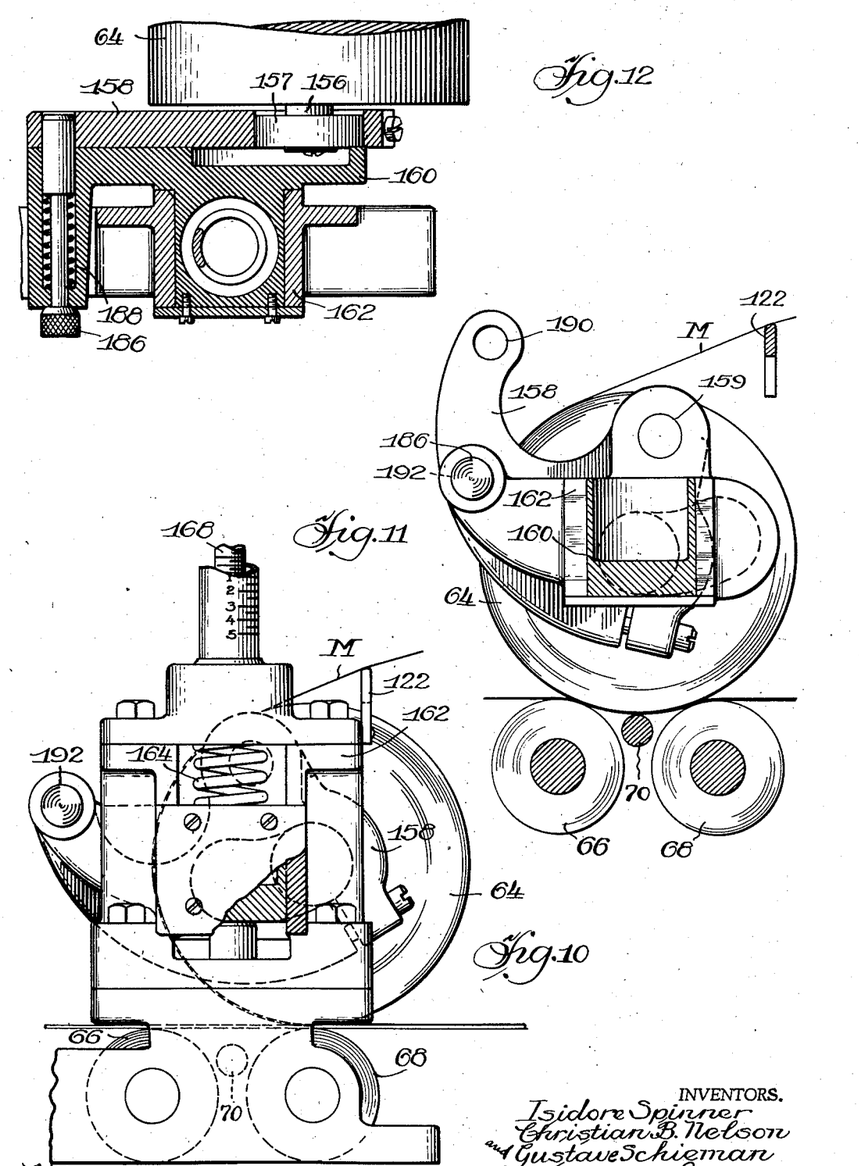
Fig. 10 is an end view of means for moving one of the rollers longitudinally of the machine.
Fig. 11 is a similar view to Fig. 10 but showing the parts in a different position.
Fig. 12 is a horizontal section through the structure shown in Figs. 10 and 11.
Figure 15:
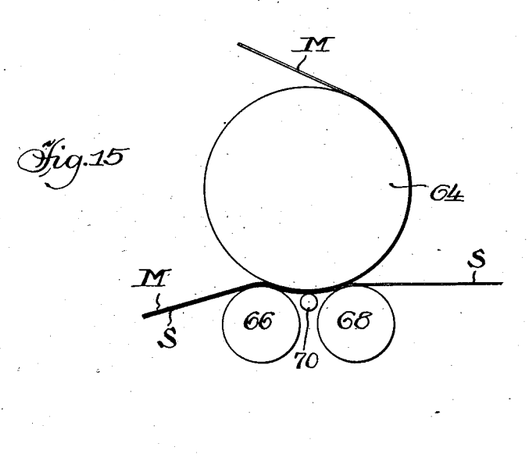
Fig. 15 is a diagrammatic view.
Figure 16:
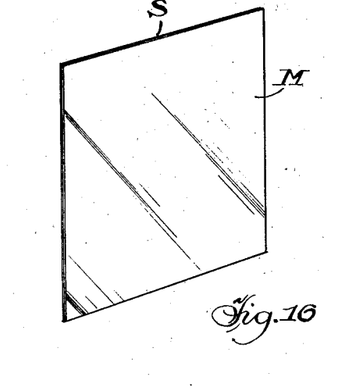
Fig. 16 is a perspective view of a composite sheet made in accordance with the present invention.

After leaving the roller 34 and rolls 36, the stock is passed to a pair of superimposed rollers 60, 62, the former being mounted in bearings in the brackets 38 and the latter being mounted in bearings carried by the side plates 24. If desired, the stock S in passing from the roller 34 and rolls 36 to the rollers 60, 62, can be supported by a support 61 (see Fig. 7), held in place in the machine by a transversely extending bar 63. After leaving the rollers 60 and 62, the stock is fed between a large, preferably rubber covered, roller 64 engaged by two smaller rollers 66 and 68 located therebeneath and it is here that the Cellophane or other cellulosic material M is brought into contact with the upper surface of the stock and firmly and accurately pressed down thereagainst by the inter-action of the rollers 64, 66 and 68. If desired, a fourth roller 70 may be interposed between the rollers 66 and 68, as shown in Figs. 7 and 10, so as to insure that the stock and the cellulosic material are kept in the closest contact at this stage of the operation. It should here be pointed out that the pressure exerted by the three or by the four rollers just discussed is all that is necessary to insure a firm bond between the stock and the cellulosic covering, the latter having previously been treated so as to render that surface, which contacts with the upper surface of the stock, adhesive.

After leaving the rollers 64, 66 and 68 (and 70 if this is employed), the product slides down the apron 72 mounted on the inclined portion 74 of the side plates 24 to a pair of rollers 76 and 78, whereafter the cellulosic material is severed coincident with the pieces of stock secured thereto in any suitable manner and by any suitable means.

Figure 8:
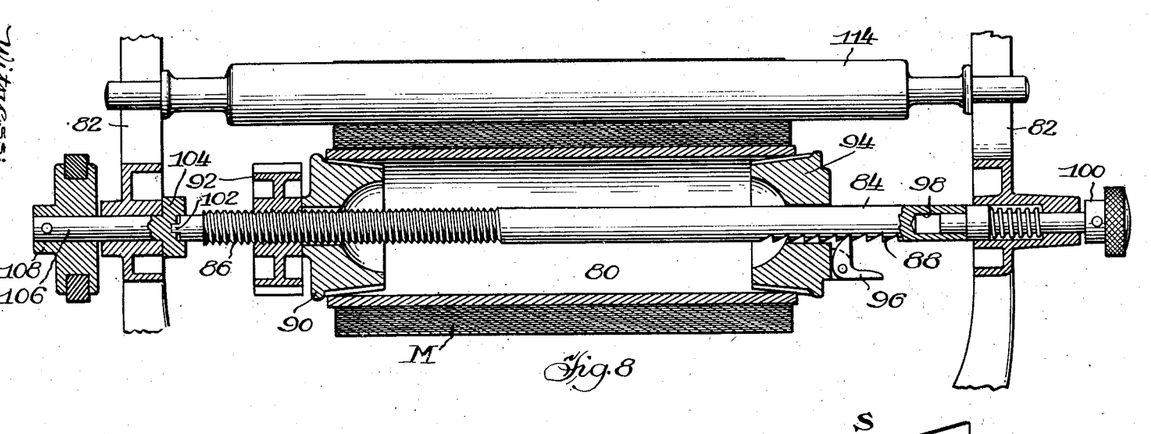
Fig. 8 is a cross-section on the line 8—8 of Fig. 1.

The cellulosic material M, which is fed to the rubber covered roller 64, is carried in roll form (see Fig. 8) on a cylinder or hollow core 80 on which it comes from the factory. To mount this hollow core 80 in the machine, the latter is provided with a pair of bent-over upstanding arms 82 in which is mounted a shaft 84 having a screw threaded portion 86 and a plurality of ratchet teeth 88. Mounted on the shaft adjacent the screw threaded portion 86 thereof is a tapered block 90 which can be moved into or out of engagement with the core 80 by means of a nut or wheel 92, the interior of which is screw threaded to engage the screw threads 86. At the opposite end of the core, the shaft 84 carries a second block 94 which is provided with a pawl 96 adapted to engage one of the ratchet teeth 88. This arrangement permits different widths of cellulosic material to be mounted in and utilized by the machine and in order that one core may be removed and another substituted, provision is made whereby the shaft 84 can readily be demounted from the machine; hence, at one end the shaft is hollowed out as at 98 so as to receive and normally be held in place by a spring pressed plunger 100 housed in one of the arms 82. The opposite end of the shaft is provided with a key 102 which is normally positioned in a cooperating key-way formed in a block 104 carried by the other arm 82; this block having an outwardly extending shaft 106, which normally forms a continuation of the shaft 84, and on which is mounted the wheel 108 the purpose of which will hereinafter appear.

To remove the shaft 84 and the core carried thereby from the machine, it is only necessary to retract the plunger 100 to release the adjacent end of the shaft and then the opposite end of the shaft can be detached by merely separating it from the block 104 as will be understood.

To remove the core from the shaft, it is only necessary to retract the blocks 90 and 94 from engagement with the core 80 after unscrewing the hand wheel 92 and disengaging the pawl 96 from the tooth 88 with which it is in engagement.

Figure 1:
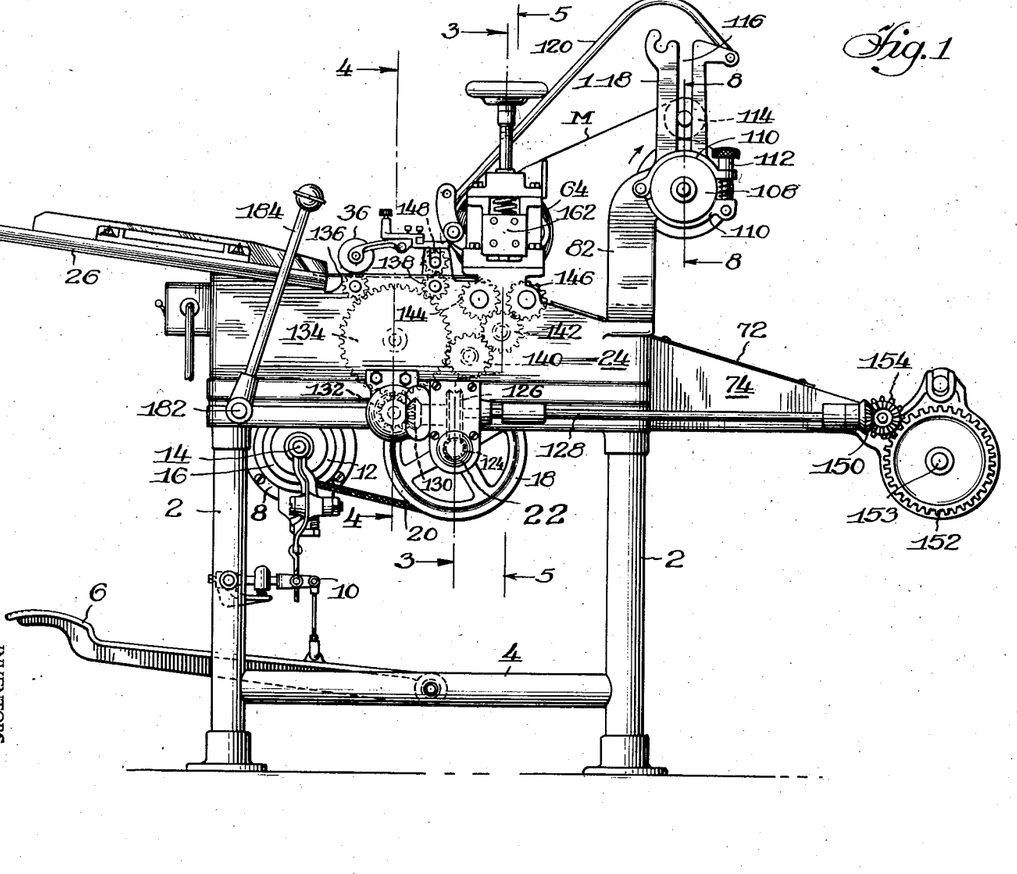
Fig. 1 is a front elevation of the machine of the invention.

In order to regulate the tension of the cellulosic material being unwound from the core 80, the wheel 108 is provided with brake bands 110, the pressure of which upon the wheel 108 can be varied by means of the screw 112. As the cellulosic material is unwound from the core 80, it is passed around a roller 114 as indicated by the arrow in Fig. 1 and hence, passes to the rubber covered roller 64. The roller 114 is mounted in slots 116 formed in upward extensions 118 of the arms 82 and as it is free to move vertically in said slots, the pressure exerted by it upon the cellulosic material on the core 80 is only that of its own weight.

120 is a guard which extends transversely of the machine over the cellulosic material being unwound so as to prevent the latter being contaminated by dust or other extraneous matter during its passage to the roller 64, whilst 122 is a vertically disposed plate with a rounded upper edge which has the effect of removing any wrinkles from the cellulosic material as it passes thereover.

The drive for the various rollers hereinbefore referred to is as follows. Bearing in mind the fact, as has already been stated, that the pulley 18 mounted on the shaft 22 is driven by the motor from the pulley 16 and belt 20, adjacent the end of said shaft 22 is mounted a worm gear 124 which drives a pinion 126 mounted on a shaft 128 extending horizontally along one side of the machine. On one end of this shaft 128 is mounted a bevel gear 130 which meshes with another bevel gear 132 which rotates a pinion 133, which engages a second pinion 134, this pinion 134 engaging toothed wheels 136 and 138 mounted on the rollers 34 and 62 respectively. The pinion 134 is also engaged by an idler 140 which in turn engages a second idler 142 and this in turn engages toothed wheels 144 and 146 mounted respectively on the rollers 66 and 68. In order to drive the roller 60 it is provided with a toothed wheel 148 which is engaged by the toothed wheel 138 carried by the roller 62.

The opposite end of the shaft 128 to that upon which the bevel gear 130 is mounted is also provided with a bevel gear 150 which rotates a pinion 152 mounted on the shaft 153 of the roller 78 through the intermediary of a combined bevel and pinion gear 154.

Figure 5:
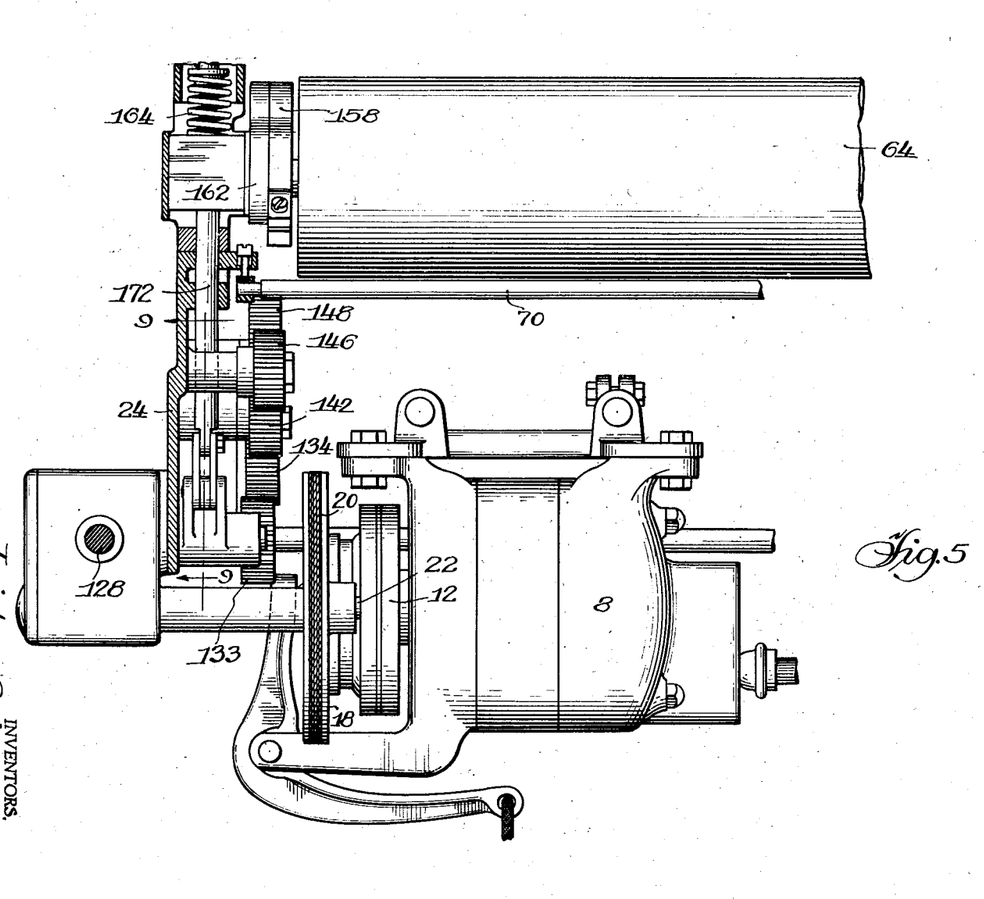
Fig. 5 is also a transverse view, partly in section on the line 5—5 of Fig. 1.

From Fig. 5 it is to be noted that the intermediate pinions are mounted on stub shafts which in turn are carried by one of the side plates 24 of the machine.

In order to vertically adjust the rubber covered roller 64 with relation to its cooperating rollers 66, 68 and 70, the shaft 156 of the said roller 64 (see Fig. 3) is mounted at each end in ball bearings 157 which in turn are carried at opposite sides of the machine by a rockable member 158 connected by pivot shafts 159 to members 160 adjustable vertically in housings 162 upstanding from and bolted to the tops of the side plates 24. Within each of the members 160 is disposed a spring 164 which at its upper end engages a shoulder 166 on the lower end of a screw threaded rod 168 disposed within the upper portions of the housings 162, the upper end of this rod being provided with a handwheel 170. Thus by turning the handwheels 170 the members 160 can be moved relative to the housings 162 and the roller 64 adjusted with relation to its cooperating rollers 66, 68 and 70 if the latter is employed.

Figures 3, 4, 9:
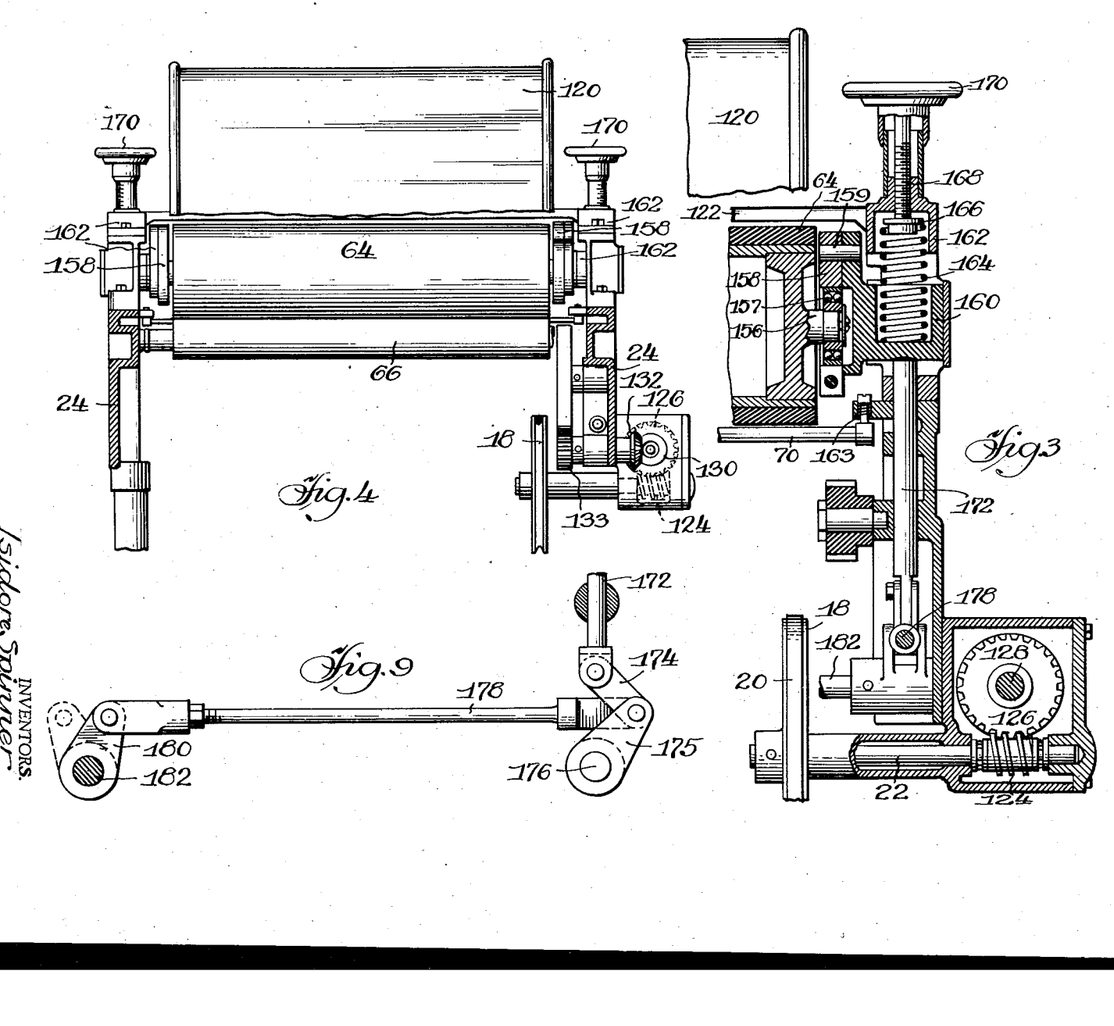
Fig. 3 is a transverse section on the line 3—3 of Fig. 1.
Fig. 4 is a transverse view, partly in section on the line 4—4 of Fig. 1.
Fig. 9 is a section on the line 9—9 of Fig. 5.

More particularly from Figs. 3 and 4 it will be noted that the intermediate roller 70 is preferably resiliently mounted through the medium of a pin and spring connection 163 to the side plates 24 at either end.

To support and to separate the rubber covered roller 64 from the rollers 66 and 68 the underside of each of the vertically adjustable members 160 is engaged by a plunger 172, the lower end of each of the plungers being pivoted to a lever 174 (see Fig. 9) which in turn is pivoted to a second lever 175 rotatively mounted upon a stub shaft 176 carried by the side plates 24. To the pivot of the two levers 174 and 175 is connected a rod 178 which at its opposite end is pivoted to a lever 180 secured to a shaft 182 extending transversely of the machine. At one end this shaft projects to the outside of the machine and is there provided with a handle 184 through the medium of which the lever 178 can be moved in one direction or the other and hence through the linkage provided raise or lower the rubber covered roller 64 through the medium of the plungers 172 and members 160.

When the machine is to operate upon heavy stocks it may be found advantageous to move the rubber covered roller 64 into engagement with but one of the rollers 66 or 68; in other words, to adjust the roller longitudinally of the machine. This can be accomplished by the means shown more particularly in Figs. 10, 11 and 12. To this end, the rockable members 158 hereinbefore referred to are provided. By moving the said rocking members 158 from the position shown in Fig. 11 to that shown in Fig. 10 the bearings 157 of the shaft 156 and hence the roller 64 will be moved from one position where it engages both rollers 66 and 68 to another in which it engages but the one roller 68. It will be noted that the rocking members 158 can be locked in either of these positions through the instrumentality of spring controlled plungers 186 located in a bore 188 in the housings 162, these plungers when in their innermost and normal position engaging one or other of two openings 190, 192, in the rocking members 158.

Figs. 13 and 14 show a modification of the rolls 36, the structure being such that whilst permitting them to always contact the roller 34, nevertheless they are capable of automatically adjusting themselves to the thickness of the stock employed. In this case the rolls are mounted upon a shaft 200 which extends transversely of the machine, by means of a split hub portion 202 which includes a disc portion 204 which flanks one side of the roll 36. From this disc portion 204 there extends a plurality of pins 206, the opposite side of the roll 36 being flanked by a plate 210 and being spaced from the disc 204 by a hub portion 212. The roll 36 is provided with a central opening and a plurality of slots 214, in each of which is free to move one of the pins 206, the slots thus permitting the necessary play of the roll.

We claim:

1. A laminating machine comprising a first set and a second set of rollers for receiving and forwarding sheets of paper stock, a relatively large rubber covered roller and a pair of rollers cooperating therewith to receive the paper stock from said second set of rollers, one of said pair of rollers cooperating with said rubber covered roller on one side of a line extending vertically through the axis of said rubber covered roller and the other of said pair of rollers cooperating with said rubber covered roller on the other side of said line, means for supplying cellulosic material to said rubber covered roller where it meets said stock and is acted on by said last-mentioned roller and said pair of cooperating rollers to bring about its lamination with the stock, means for rotating certain of said rollers, and means for conducting the resulting laminated product from the machine.

2. A laminating machine according to claim 1 which includes means for adjusting the rubber covered roller vertically with relation to said pair of cooperating rollers, said adjusting means comprising a plunger and link mechanism for supporting said rubber covered roller and for raising and lowering it with relation to its pair of cooperating rollers.

3. A laminating machine according to claim 1 which includes means for mounting said rubber covered roller in the machine comprising at each side of the machine a rockable member for receiving an end of the shaft of said roller, a housing, a member vertically adjustable in said housing, a pivot shaft connecting said rockable member and said vertically adjustable member, a spring disposed within said vertically adjustable member, means carried by the housing for varying the tension on said spring, a plunger engaging the underside of said vertically adjustable member to support same, and a link and lever connection pivoted to the lower end of said plunger whereby to raise or lower said plunger and the vertically adjustable member supported thereby.

4. A laminating machine comprising a first set and a second set of rollers for receiving and forwarding sheets of paper stock, a relatively large rubber covered roller and a bank of three rollers cooperating therewith to receive the paper stock from the said second set of rollers, one of said bank of said three rollers cooperating with said rubber covered roller on one side of a line extending vertically through the axis of said rubber covered roller, another of said bank of three rollers cooperating with said rubber covered roller on the other side of said line and the third roller of said bank being disposed intermediate of the other two rollers of said bank and being resiliently mounted in the machine, means for supplying cellulosic material to said rubber covered roller where it meets said stock and is acted on by said last-mentioned roller and said bank of cooperating rollers to bring about its lamination with the stock, means for rotating certain of said rollers, and means for conducting the resulting laminated product from the machine.

5. A laminating machine comprising a first roller and a pair of rolls cooperating therewith for receiving and forwarding sheets of paper stock, means for automatically adjusting said pair of rolls with relation to said roller, a pair of rollers for receiving said stock from said first-mentioned roller and pair of rolls, a relatively large rubber covered roller and a pair of rollars cooperating therewith to receive the paper stock from said second set of rollers, one of said pair of rollers cooperating with said rubber covered roller on one side of a line extending vertically through the axis of said rubber covered roller and the other of said pair of rollers cooperating with said rubber covered roller on the other side of said line, means for supplying cellulosic material to said rubber covered roller where it meets said stock and is acted on by said last-mentioned roller and said pair of cooperating rollers to bring about its lamination with the stock, means for rotating certain of said rollers, means for conducting the resulting laminated product from the machine, said means for automatically adjusting said pair of rolls comprising a shaft, a split hub portion for each shaft having a disc portion mounted on each shaft adapted to flank one side of said roll with a plurality of pins extending from said disc, and a plate flanking the other side of said roll and spaced from said disc by a hub portion, said roll having a central opening and a plurality of slots arranged to permit free movement of said pins therein for the purpose stated.

ISIDORE SPINNER.
CHRISTIAN B. NELSON.
GUSTAVE SCHIEMAN.